Sept. 23, 1924.
I. C. DRESSER
EDIBLE CONTAINER
Filed Sept. 6, 1922
1,509,194
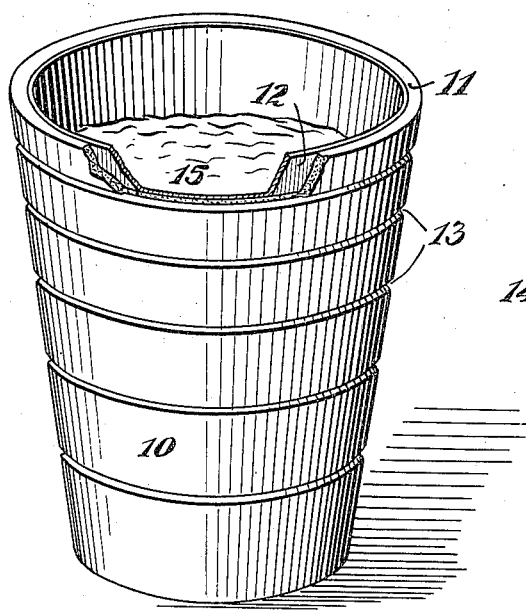
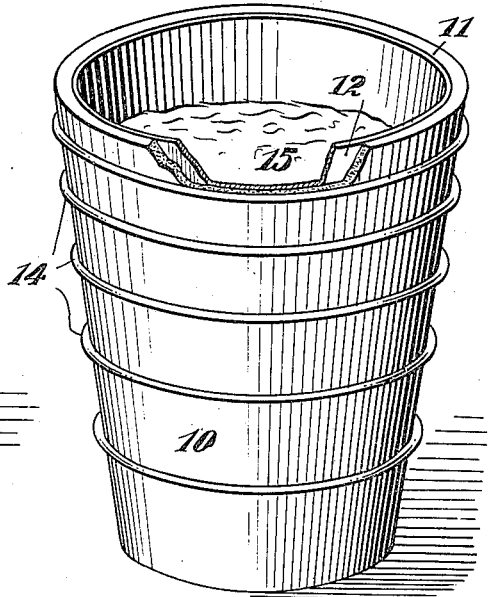
INVENTOR
Ivan Chandler Dresser
BY
Howard Freeman
his ATTORNEY Patented Sept. 23, 1924.                                         1,509,194

UNITED STATES PATENT OFFICE.

IVAN CHANDLER DRESSER, OF YONKERS, NEW YORK.

EDIBLE CONTAINER.

Application filed September 6, 1922. Serial No. 586,529.

*To all whom it may concern:*

Be it known that I, IVAN CHANDLER DRESSER, a citizen of the United States, residing at Yonkers, county of Westchester, and State of New York, have invented new and useful Improvements in Edible Containers, of which the following is a full, clear, and exact specification.

My invention relates to edible containers and refers particularly to edible containers adapted for the retention of liquids for a desired length of time.

One of the objects of my invention is an edible container which has been so treated with an edible material as to render it capable of retaining liquid contents for a considerable length of time.

Another object of my invention is an edible container rendered capable of containing a liquid by means of an edible composition and in which there are lines of breakage within, or carried by, the container, in order that the upper portion may be broken away in sections without cracking, or breaking, the container below a desired line.

Another object of my invention is an edible container of the above described character capable of containing a liquid without leakage during the breaking away of upper portion sections thereof.

The above and other valuable features of the device of my invention will be evident upon a consideration of its description as outlined in this specification.

My device is particularly directed to those circumstances in which it is desirable to have both solid and liquid food in a compact, economical, and hygienic condition, as, for instance, in school and institution luncheon rooms and for sale to the public over the counter where consumption is accomplished at, or near, the place of purchase.

By forming the container of my invention from baked dough, I am able to produce it in a form and condition suitable for the purpose of liquid containing while having it possess nutritive and palatable properties in a compact and hygienic form.

While containers ordinarily produced from dough and baked into a friable condition are porous and are not capable of retaining liquid contents, I have found that they can be converted into a liquid containing condition without changing the edible character of the container walls, by coating them with, or incorporating therein, a liquid impervious edible material having the property of overcoming the porosity of the container walls.

This coating material may have desirable flavors and nutritive value, thus increasing the usefulness, attractiveness and edible properties of the device.

This liquid impenetrability possesses the further advantage that the device can be employed as a container for a desired liquid, such as milk, thus combining the food values of the baked dough with the liquid in a compact and attractive form, free from the unhygienic uses of common drinking utensils.

In a form of the device of my invention, the container may carry upon its sides a plurality of spaced breaking means, formed by weakened or strengthened portions of the sides, so that when a portion of the upper portion is broken away, the side wall will not be disrupted below the breaking lines. By these means, the container may be filled with a liquid and the walls above the liquid surface broken away for eating purposes, without danger of leakage, and the container may thus be consumed as the liquid contents are consumed.

Figure 1 is a perspective view of a form of the device of my invention, partially broken away for clearness of description.

Figure 2 is a perspective view of a modified form of the device of my invention, partially broken away for clearness of description.

All of the devices shown in the drawings comprise a cup having the upwardly and outwardly flaring annular side 10, closed at the bottom and open at the top, the formation being of such a character that the cup will stand firmly upon its bottom portion. The side 10 and the bottom are composed of an outer layer of edible farinaceous material 11 with an inner layer of a liquid impervious edible material 12, as chocolate, the inner layer extending over and abutting upon the inner face of both the side and the bottom of the cup.

In Figure 1, the side 10 has a plurality of spaced recessed bands 13, 13, and, in Figure 2, the side 10 has a plurality of spaced beads 14, 14, the bands and beads acting as cleavage lines to prevent the breaking away of the side 10 below the next lower band or bead, when the upper portion of the cup is bitten away.

It is evident from the above that my device has the physical dimensions of a drinking cup, that it is entirely edible and that the liquid 15, as milk, will be retained within the cup by the liquid impervious layer of edible material 12, which prevents the liquid from coming into contact with the absorbent and porous baked dough 11.

As an example of my invention, I mention the following:—

A suitable edible dough is formed, or molded, into the shape of a cup and baked until it is hard and friable, I then coat the interior surface of the thus formed friable container with melted chocolate of sufficient consistency to cover over the pores of the container and of such composition that the layer thus formed will firmly adhere to the container face and be practically hard at ordinary temperatures.

The thus produced container is attractive, nutritious and hygienic and is of such a character that it will retain a liquid, as milk, during the time necessary for its consumption.

It is evident that as the upper portion of the container can be eaten as the liquid is consumed, the device of my invention has valuable and useful features.

By "liquid impervious edible lining" as used in my specification and claims, I mean an edible lining of such composition and character that it will allow the device to hold a liquid for sufficient time for its ordinary consumption without leaking, breaking down or materially softening.

Instead of employing the above-mentioned chocolate, I can use other edible fats, butters and other products which will effect the objects of my invention, therefore, I do not limit myself to the particular size, shape, materials, or steps of process described in my example, which is given simply as a means for clearly defining my invention.

What I claim is:—

A drinking cup, open at its top and capable of standing upon its own bottom, comprising a baked farinaceous container having a bottom and side walls, a liquid impervious edible lining coating the inner faces of said container and means whereby a breakage of the upper portion of the cup will be limited in its downward fracture of the wall thereof to a predetermined distance from the bottom of the cup.

Signed at New York city in the county of New York and State of New York this 31st day of August, 1922.

IVAN CHANDLER DRESSER.